United States Patent [19]
Adachi et al.

[11] Patent Number: 5,657,185
[45] Date of Patent: Aug. 12, 1997

[54] FLOATING MAGNETIC HEAD HAVING A REINFORCED STRUCTURE AND A MANUFACTURING METHOD THEREOF

[75] Inventors: Shigeyuki Adachi; Toshihiro Horiuchi; Kazuyuki Kurita, all of Shizuoka-ken, Japan

[73] Assignee: Minebea Co., Ltd, Nagano-ken, Japan

[21] Appl. No.: 622,300

[22] Filed: Mar. 25, 1996

[30] Foreign Application Priority Data

Aug. 9, 1995 [JP] Japan .................. 7-224775

[51] Int. Cl.⁶ .................................................. G11B 5/60
[52] U.S. Cl. ............................... 360/103; 29/603.12
[58] Field of Search ........................... 360/103, 123; 29/603

[56] References Cited

U.S. PATENT DOCUMENTS 5,359,479  10/1994  Karam, II .................... 360/103
5,485,332  1/1996   Egawa et al. ................. 360/103
5,546,251  8/1996   Egawa et al. ................. 360/103

FOREIGN PATENT DOCUMENTS

602486-A2  6/1994   European Pat. Off. ........... 360/103
600280-A2  6/1994   European Pat. Off. ........... 360/103
5-342514   12/1993  Japan ......................... 360/103
6-76224    3/1994   Japan .

Primary Examiner—John H. Wolff
Attorney, Agent, or Firm—Oliff & Berridge

[57] ABSTRACT

On one end of a first slider member 2A, a first hole 10 and a second hole 11 for coils 30, 31 are provided. The first slider member 2A further includes first and second poles 12,13 to wind the coils 30, 31 together with the magnetic head core 6. A second slider member 2B is provided having a groove 14 for accommodating the coils 30, 31. Thereby, the poles 12,13 contribute to bridge the groove 14 and reinforce the side portion of the second slider member 2B which is weakened by the groove 14. This increases the strength of the apparatus.

2 Claims, 3 Drawing Sheets

F I G . 3
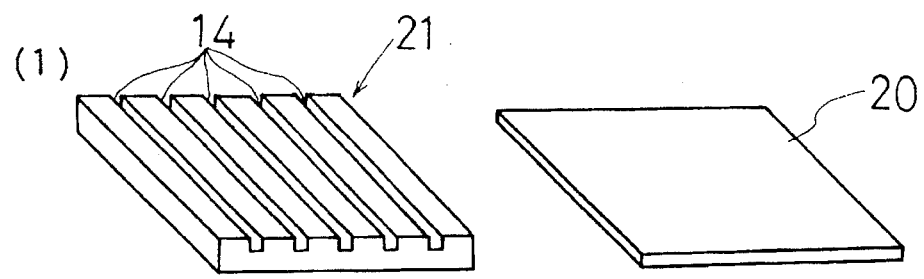
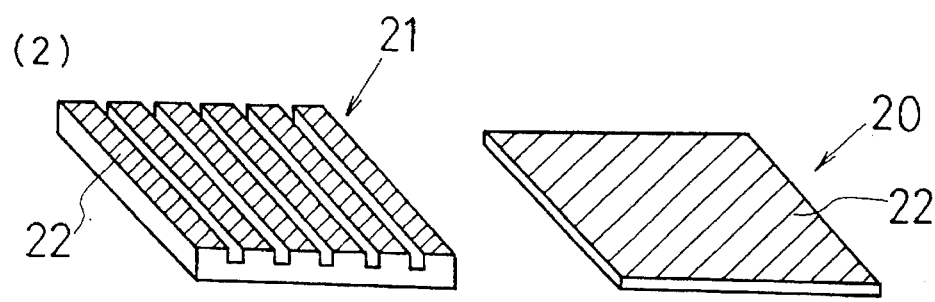
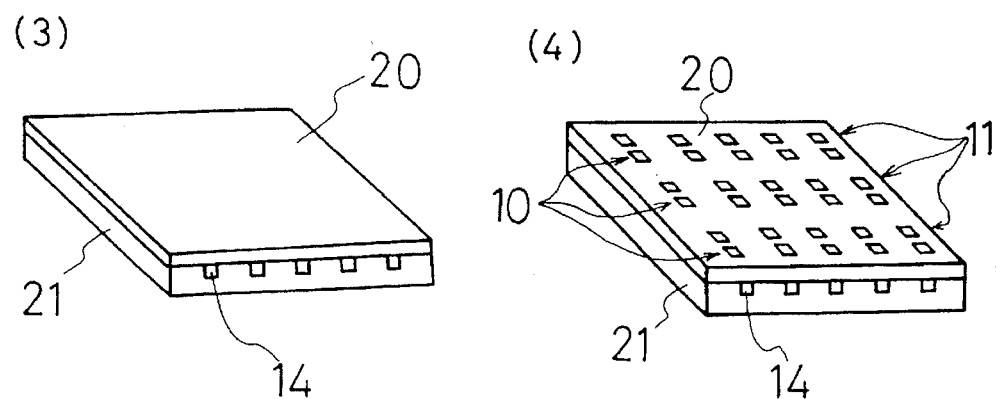
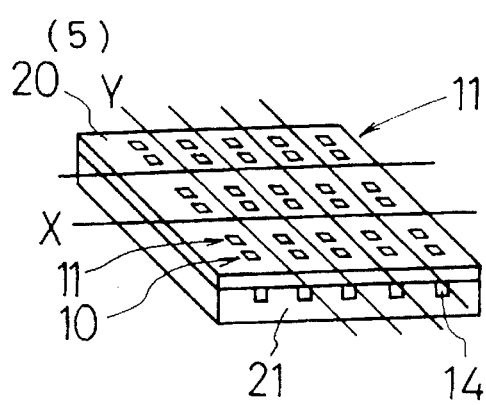
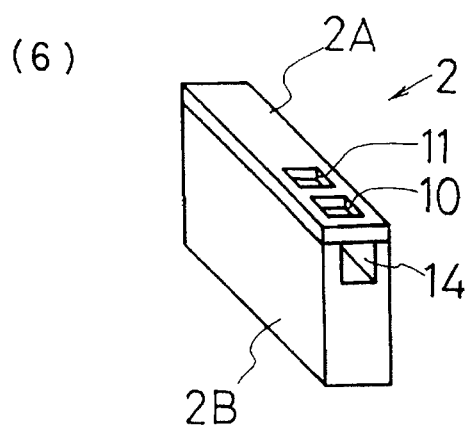

5,657,185

FLOATING MAGNETIC HEAD HAVING A REINFORCED STRUCTURE AND A MANUFACTURING METHOD THEREOF

BACKGROUND OF THE INVENTION

1. Field of the invention

The present invention relates to a floating magnetic head for use of magnetic recording apparatus such as magnetic disk apparatus and the manufacturing method of the same.

2. Description of the prior art

As an example of the conventional floating magnetic head, as shown in FIG. 4, a slider 2 provided with a cut out portion 1 at one corner thereof and a magnetic head core (not shown) for use of magnetic recording and reproducing apparatus is bonded to the side of the slider 2. In this floating magnetic head, coils (not shown) wound around the magnetic head core are accommodated inside the cut out portion 1 and avoid the interference with the slider 2.

Now, the miniaturization of the floating magnetic head has been developed and the employing rate of such as the cut out portion 1 in the slider 2 has become great, so that not only the slider 2 itself but also the apparatus as a whole the strength has become weak. As a result, it has been a problem that, in the assembly of the floating magnetic head and the handling thereof in working, in the case of receiving a mechanical shock, the slider 2 and the magnetic head are apt to become damaged or broken. For solving the above problem, it has been considered to think that, as shown in Japanese patent laid-open No. Hei 6-76224, a reinforcing post is attached to a cut out portion of a slider of a floating magnetic head.

On the other hand, in the type of the floating magnetic head according to the publication 6-76224, since the structure is such as a reinforcing portion is added to the cut out portion for coils, the productivity thereof is low, so that it is not an appropriate improvement therefor.

SUMMARY OF THE INVENTION

The present invention has been made in the light of the above circumstance, to provide a floating magnetic head having a mechanical strength and an improved productivity, and a method of the manufacture thereof.

According to the present invention, in the floating magnetic head, in which a floating force is generated in a slider through a rail provided thereon on a magnetic recording medium, and to the side of the slider a magnetic head core for magnetic recording and reproducing is attached, the slider is formed of a first slider member and a second slider member made of non-magnetic ceramics and bonded with each other, and one end of the first slider member is provided with holes and a pole for coils to be wound with the magnetic head core and one end of the second slider member is provided with a groove for accommodating the coils correspondingly to the portion on which the holes and a pole are provided. The manufacturing method of the present invention is characterized in that, in a floating magnetic head for recording and reproducing in the type of which the magnetic head core is bonded to the side of the slider formed with a thin plate-like slider member and a second thick plate-like slider member and provided with rails which receive a floating force on the magnetic recording medium, the method includes the steps of forming a plurality of grooves in parallel on one side of a second slider base member, bonding the first slider base member to the one side of the second slider base member, providing a set of pair of holes along the grooves at a predetermined spacing and slicing the bonded two first and second slider base members corresponding the holes to obtain a plurality of sliders.

BRIEF EXPLANATION OF THE DRAWING

FIG. 3 is a process drawing showing the manufacturing method of the floating magnetic head.

EMBODIMENT

Figure 1:
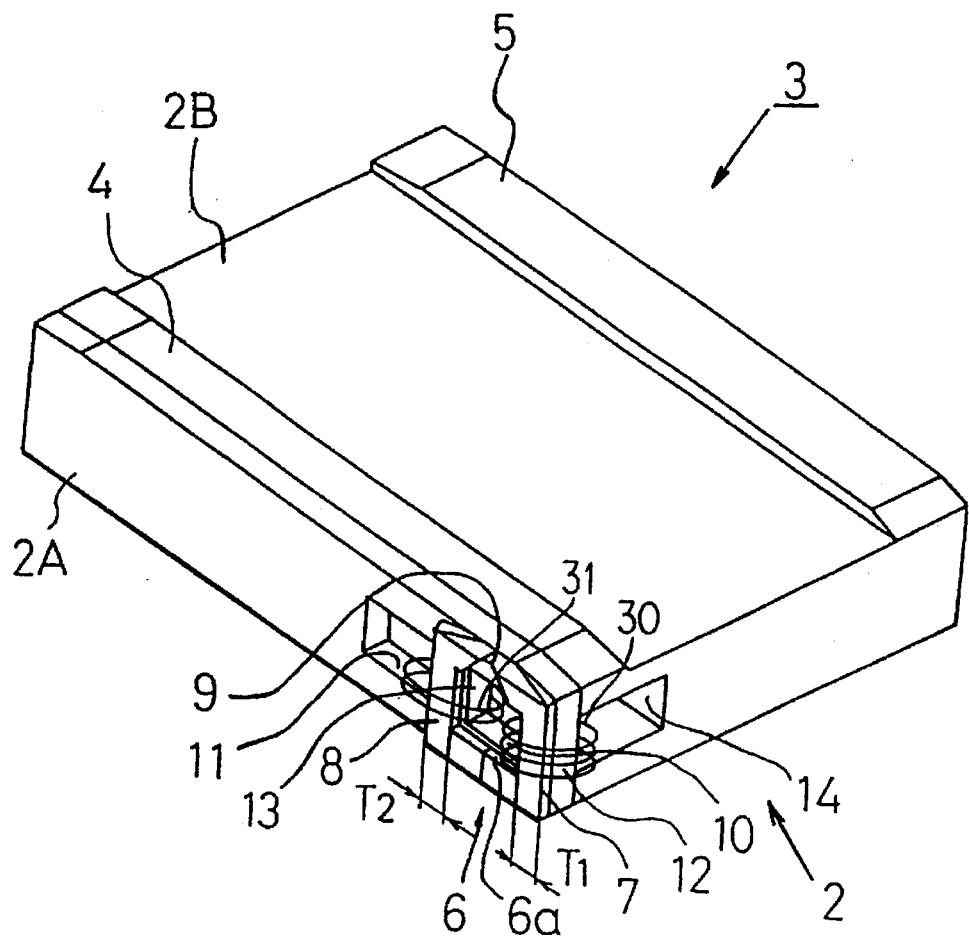
FIG. 1 is a perspective view of a first embodiment of a floating magnetic head according to the present invention.

Hereinafter, one embodiment how to form a floating magnetic head according to the present invention and the manufacturing method of the same will be explained referring to FIGS. 1 and 2. The floating magnetic head 3 shown in FIG. 1 is so constructed that the side face of the slider 2 having a pair of rails 4, 5 which receive a floating force F (in FIG. 2) magnetic recording medium (not shown) is bonded by a recording and reproducing magnetic head core 6. The magnetic head core is formed approximately circular in an approximately C-letter shape respectively, to give a pair of a first and a second core bodies 7 and 8 bonded in their ends. At the joint portion on one end of the magnetic head core 6, a magnetic gap 9 for recording and reproducing is formed. The magnetic head core 6 is bonded to a first slider body 2A with its magnetic gap 9 disposed on the same side of the pair of rails 4, 5 of a second slider member 2B. On each of core bodies 7 and 8, as explained later, coils (not shown) are wound for functioning as recording and reproducing.

The slider 2 is formed in general from the first slider member 2A and the second slider member 2B. On one side of the first slider member 2A to which the magnetic head is bonded, as shown in FIG. 2, a first rectangular hole 10 and a second rectangular hole 11 (hereinafter referred to as "the first hole for coils and the second hole for coils) are provided along the longitudinal direction. Due to the provision of the first and second holes 10 and 11 for coil, on the end of the first slider member there is a first pole 12 and between the first hole for coils and the second hole for coils there is a second pole 13 provided.

The width $S_1$ and $S_2$ of the first pole 12 and the second pole 13 are set approximately identical with the width $T_1$ and $T_2$ of the first core 7 and the second core 8 respectively, and the length of the hole for coil 30 is set equivalent to the hole 6a formed in the magnetic head core 6. The first and second poles 12 and 13 are bonded to the first and the second cores 7 and 8 respectively. Around the first pole 12 and the first core 7 bonded thereto and the second pole 13 and the second core 8 bonded thereto coils are wound respectively and both coils are connected in a balanced manner (i.e. wound so as to cancel an induced motive force even when an outer magnetic field is acted).

At the portion of the second slider member 2B for use the second slider, to which the first slider member 2A for use of the slider is bonded, a groove 14 is provided along the first rail 4. By the provision of this groove 14 one portion of the coils of the magnetic head core 6 is accommodated.

As mentioned above, on one end of the first slider member 2A to be bonded by a magnetic head core 6, the first hole 10 for coil 30 and the second hole 11 for coil 31 are formed leaving the first pole 12 and the second pole 13 to be wound with coils respectively, and at the portion of the second slider member 2B, to which the first slider member 2A is bonded, a groove 14 is provided for accommodating one portion of the coils, thereby the second member 2B becomes weak in the vicinity of the groove 14, however the first pole 12 and the second pole 13 to be bonded thereto bridges the groove 14 to reinforce the side portion of the second slider member 2B. By this, the strength of the slider 2 becomes great, so that at the time of assembling or working, the slider 2 and the magnetic head core 6 to be bonded thereto are not easily damaged or broken.

And due to the increase of the strength of the slider 2, it prevents from being deformed, so that, in the case of a necessity of low floating, it can easily be realized. It has been proved experimentally that such outstanding strength of the slider 2 is obtained as explained below.

Figure 2:
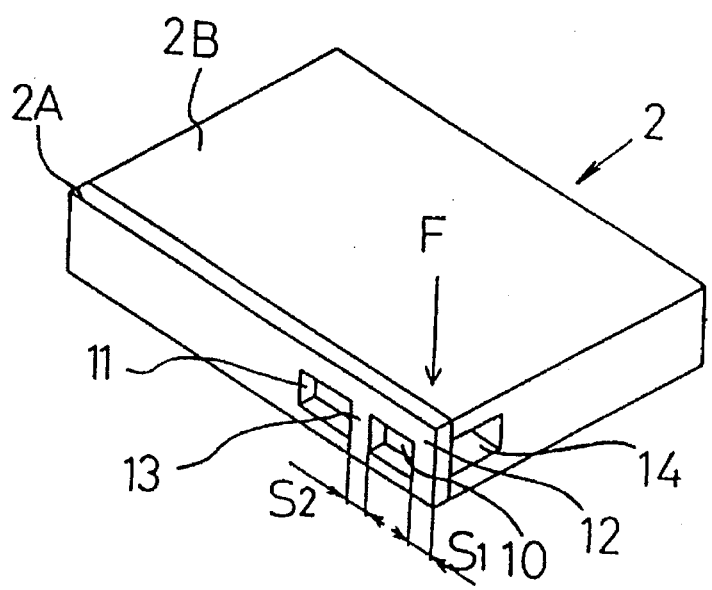
FIG. 2 is a perspective view of a slider used in a floating magnetic head according to the present invention.
Figure 4:
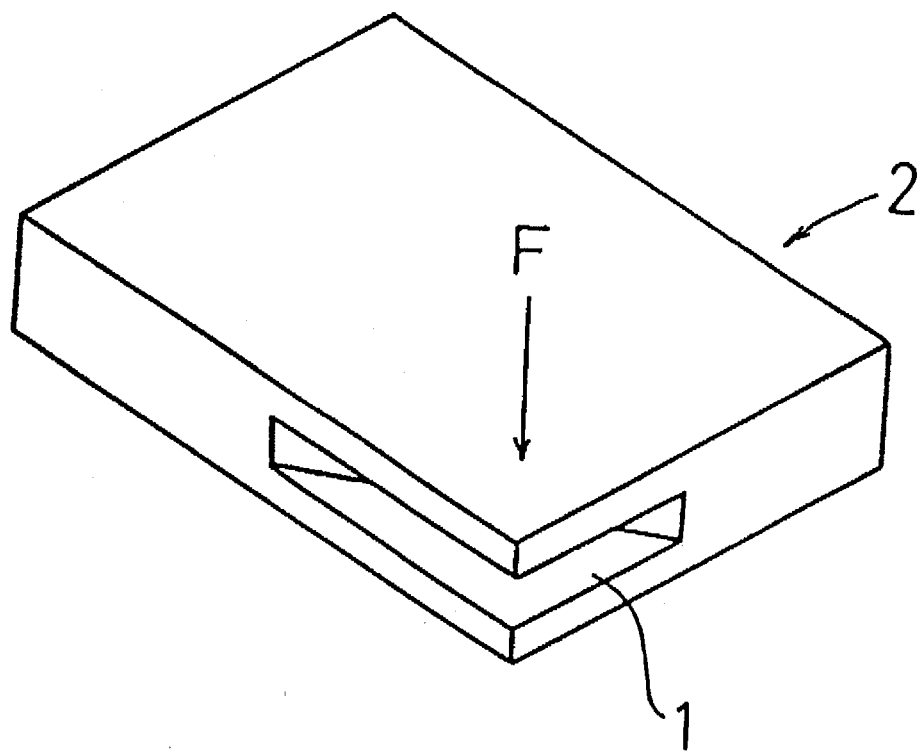
FIG. 4 is a perspective view of a slider of a conventional floating magnetic head.

The breaking strength test to prove the acquirement of the strength has been conducted using the slider 2 shown as in FIG. 2 and a conventional slider 2 shown in FIG. 4. In this test, as shown in FIGS. 2 and 4, load of the arrow direction of F is applied to the corner of the slider member 2B using a metal having 0.3 mm in diameter until its breaking. According to the test result as shown in Table 1, it was proved that the slider 2 of the present invention described in FIG. 2 is stronger than the slider 2 of the prior art described in FIG. 4 by 1.75 times in the breaking strength.

TABLE 1

|  | Slider 2 of FIG. 2 (present invention) | Slider 2 of FIG. 4 (conventional art) |
| --- | --- | --- |
| Breaking strength | 1.4 Kg (weight) | 0.8 Kg (weight) |

In the above described floating magnetic head 3, the slider 2 is constructed by bonding the first slider member 2A to the second slider member 2B. Accordingly the groove 14 for accommodating coils is easily prepared. That is, in the floating magnetic head shown in the publication of Patent laid-open No. 6-76224, it has such a construction as a reinforcing member is attached to bridge a groove for coil accommodation, so that it happens to lower the productivity of a slider i.e. the apparatus as a whole. On the contrary, in the floating magnetic head 3 of the present invention as shown in FIGS. 2 and 3, since the groove 14 for the coils is formed in the second slider member 2B while the first pole 12 and the second pole 13 remain for reinforcing in the first slider member 2A, the production is carried out easily, to that extent, the productivity becomes superior.

Next, a method of preparing the floating magnetic head according to the present invention will be explained referring to FIGS. 1 and 2.

In FIG. 3, reference numerals 20, 21 show base members for making the first slider member 2A and the second slider member 2B, which are non-magnetic ceramics, and those are made thin and thick respectively. First at the step (1), on one side of the second slider member 21 a plurality of parallel grooves are formed, and that surfaces of the base member 21 and one side of the first slider base member 20 are polished until it becomes a mirror face.

At the step (2), on the polished surfaces of the first and the second slider base members 20, 21, a glass layers 22 of 0.4 μm thickness is applied by sputtering at 980° C.

Subsequently, the first and the second slider base members 20, 21 are encountered and under a pressure over 5 gf/mm$^2$ and at the heat treatment of 980° C. in the air.

Although the glass temperature of 980° was used, it was because of the reliability of bonding, so that the temperature is not limited to it. Further, the first and second slider base members may be bonded by heating at the vicinity of the softening temperature of the slider base members and under a given pressure without any glass as a bonding agent. Next, at the step (4), on the portion of the first slider base member 21 corresponding to and along the groove 14, plural pair of holes, a first hole and a second hole 10 and 11, at a given spacing, are provided by a laser working (YAG laser, wave length is 266 nm). These first and second holes 10 and 11 form the hole 10 for coils 30 and the hole 11 for coils 31 of FIGS. 1 and 2, and hereinafter refers to the first hole 10 for coils 30 and the second hole 11 for coils 31.

In the embodiment, the working is exemplified in a laser working for the first and second 10, 11 for coils 30, 31 however it is not limited to that, it may be carried out also by means of an ultra-sonic cutting or an ion-etching.

Subsequently, at the step (5), the bonded slider base members are sliced in such a manner as containing the two holes 10, 11 for coils 30, 31 in the direction of X-Y and perpendicular to the bonding surface (X, Y) of the first and second slider base members to obtain (the step 6) a plurality of the sliders 2 equivalent to the slider shown in FIG. 2. And, for bonding the magnetic head core 6, the side to be bonded of the first slider base member 21 is polished until it becomes a mirror.

Next, the bonding of the magnetic head core 6 and the coil winding etc are carried out to obtain the floating magnetic head 3.

As mentioned above, it is attained quite easily to obtain the groove 14 on the slider 2 because of the following steps of, forming in parallel the plurality of grooves 14 on one side of the second slider base member 21, bonding the first slider base member 20 to the one side of the second slider base member 21, forming plural pairs of the first and the second holes 10 and 11 for coils 30 and 31 along the portion corresponding to each groove 14 at a given spacing and obtaining a plurality of slider 2 by slicing the bonded first and second slider base members 20 and 21 in such a manner as the first slider hole 10 for coils 30 and the second slider hole 11 for coils 31 are contained. Further, since a plurality of slider 2 are obtained by merely by slicing the bonded the first and the second slider base member 20, 21, a prompt production of the plural number of slider 2 is available.

In the floating magnetic head shown in Patent Laid-open No. 6-76224, since the construction for reinforcing of a slider is to bridge the groove for accommodating coils, an additional process for preparation of a reinforcing is necessary, so that the production of plural sliders is difficult and may lower the productivity because of that. On the contrary, in the manufacturing method of the present invention, as mentioned above, the grooves for accommodating coils are easily produced, accordingly the productivity becomes superior, and the production of the slider 2 is carried out in a time, the total productivity is increased.

In the present invention, although, since the grooves for accommodating coils are provided on the second slider base member corresponding to the bonded first slider base member, the second slider member becomes weak at that point, the first pole and the second pole of the first slider base member will bridge the groove by bonding thereto to reinforce the side portion of the second slider base member, which becomes weak mechanically. Accordingly, the strength of the slider is increased, so that it and a magnetic head core bonded thereto are prevented from being damaged or broken easily at the time of such as assembling or working. Further, due to the increase of the strength of the slider, the slider is prevented from being deformed, thereby in the case of lowering floating amount, it can be arranged precisely. Further, comparing the case where the slider is provided singly and the groove for accommodating coils and a reinforcing member are provided on that slider, the groove for accommodating coils is provided on the second slider base member and the poles are provided on the first slider base member, so that the productivity is increased.

In the method of the present invention, since plural grooves are formed in parallel on one side of the second slider base member including the steps of bonding the first slider base member on the one side of the second slider base member, forming plural pairs of holes i.e. the first hole for coils and the second hole for coils at a given spacing on the portion of the first slider base member corresponding to the groove and slicing the bonded first and second slider base members correspondingly to the first and the second holes for coils to obtain the plural sliders, comparing it with the case where the slider is prepared singly by being provided with the grooves for coils and some reinforcing members attached thereto, the production can be easily carried out and the productivity is increased. In addition, it becomes possible to produce promptly a plurality of sliders at a time, to that extent the productivity can be increased.

What is claimed is:

1. In a floating magnetic head having reinforcing structure comprising a magnetic recording head core for use of recording and regenerating, which is bonded to the side of a slider provided with rails to generate a floating force on the slider above a magnetic recording medium, said floating magnetic head made of non-magnetic ceramics and formed from a first slider base member and a second slider base member which are formed by being divided along one of the longitudinal rails and bonded to each other, the first slider is plate-like, to which the magnetic head core is bonded from outside, and is provided with two holes leaving two poles for winding coils together with two head core bodies bonded to each pole respectively and on the portion of the second slider base member opposing to the holes of the first slider base member a groove to allow the coils to be wound is provided with.

2. In a method of manufacture of a floating magnetic head comprising a magnetic recording head core for use of read/write, which is bonded to the side of a slider provided with rails to generate a floating force on the slider above a magnetic recording medium, the method comprises the steps of preparing a first thin plate-like slider base member and a second thick plate-like slider base member made of non-magnetic ceramics respectively, the second thick plate-like slider base member being provided with a plurality of grooves in parallel on one side, bonding the first thin slider base member to the one side of the second thick slider base member, providing with plural pairs of holes for coils on the first slider base member corresponding to each groove at a regular spacing and slicing the bonded first and second slider base members bonded along the holes to obtain plural sliders in such a manner as including a pair of holes together with the groove in a given thickness of the slider leaving two poles having similar dimensions between said two holes piece by piece, bonding a magnetic head core to the poles and winding coils on the cores together with the poles respectively.

* * * * *